Dec. 25, 1962 W. SMEULERS 3,070,753
CIRCUIT ARRANGEMENT FOR SYNCHRONIZING A RELAXATION OSCILLATOR
Filed Feb. 23, 1960 6 Sheets-Sheet 1

INVENTOR
WOUTER SMEULERS
BY
Frank R. Jufari
AGENT

INVENTOR
WOUTER SMEULERS
BY [signature]
AGENT signals as shown in FIG.1c for a relative large frequency difference between frequency of synchronizing signal and natural frequency of oscillator.

INVENTOR
WOUTER SMEULERS
BY Frank R. Jufari
AGENT

INVENTOR
WOUTER SMEULERS
BY
Frank R. Jefani
AGENT

Dec. 25, 1962 W. SMEULERS 3,070,753

CIRCUIT ARRANGEMENT FOR SYNCHRONIZING A RELAXATION OSCILLATOR

Filed Feb. 23, 1960 6 Sheets-Sheet 5 several signals shown for an out-synchronisation position.

INVENTOR
WOUTER SMEULERS

BY Frank R. Jufari
AGENT

Dec. 25, 1962 W. SMEULERS 3,070,753

CIRCUIT ARRANGEMENT FOR SYNCHRONIZING A RELAXATION OSCILLATOR

Filed Feb. 23, 1960 6 Sheets-Sheet 6

INVENTOR
WOUTER SMEULERS

BY Frank R. Jifani
AGENT

United States Patent Office 3,070,753

Patented Dec. 25, 1962

3,070,753

CIRCUIT ARRANGEMENT FOR SYNCHRONIZING A RELAXATION OSCILLATOR

Wouter Smeulers, Eindhoven, Netherlands, assignor to North American Philips Company, Inc., New York, N.Y., a corporation of Delaware Filed Feb. 23, 1960, Ser. No. 10,274
Claims priority, application Netherlands Mar. 5, 1959
9 Claims. (Cl. 331—11)

This invention relates to circuit arrangements for synchronizing a relaxation oscillator, in particular the oscillator for producing the control voltage for the vertical deflection circuit in a television receiver, by means of square synchronizing pulses which are supplied to a phase detector to which is also supplied a comparison signal derived from the relaxation oscillator, the output voltage of the phase detector being smoothed in a smoothing network to a direct voltage, which smoothing network is connected to an input terminal of the oscillator.

In such a regulating circuit, the problem always arises that, if the interference sensitivity is satisfactory the time constant of the smoothing network has to be very large. As a result, however, the so-called catching-range of the regulating circuit becomes small, so that measures have to be taken to extend this catching-range.

One of these measures is, for example, to supply a so-called search voltage to the regulating circuit. This search voltage may originate from a searching oscillator which is connected directly to the regulating circuit, but it is also possible to supply the search voltage derived from the searching oscillator to the regulating circuit via a gate circuit. In the so-called out-of-synchronization condition, this search voltage varies the frequency of the relaxation oscillator at a very slow rate so that this frequency is brought into the catching-range of the regulating circuit and automatic synchronization results.

A draw-back of this type of search-voltage oscillators is that the frequency of the search voltage should be very low, since otherwise the frequency of the relaxation oscillator passes the catching-range of the regulating circuit too rapidly and catching is precluded. This is the case especially if the natural frequency of the oscillator is already very low, for example for the relaxation oscillator in a television receiver, which produces the control voltage for the vertical deflection circuit. The frequency of such a relaxation oscillator amounts to 50–60 c./s., so that in this case the frequency of the search voltage would have to amount to 1 to 2 c./s.

It will be evident that making such a search voltage oscillator may entail a lot of difficulties in connection with the low frequency, while, if this search voltage would be supplied via a gate circuit, the construction of this gate circuit would likewise be difficult.

A second draw-back of the exclusive use of a regulating circuit for synchronizing a relaxation oscillator at a low frequency is that also the inertial is to be made very high when so-called fly-wheel action is to be obtained. This is achieved by giving the smoothing network a considerable time constant.

From this it follows that, if a so-called off-out-of-synchronization condition occurs for some reasons for example by changing over from one television transmitter to another due to frequency variation of the synchronizing signal, it will take considerable time to re-establish the in-synchronization condition.

The circuit arrangement according to the invention mitigates these drawbacks and is characterized in that it comprises a channel, the output of which is connected to an input terminal of the oscillator, and in which an integrating network is included to integrate the square synchronizing pulses supplied to the input of the channel.

The circuit arrangement according to the invention is based on the recognition that the synchronization of the relaxation oscillator can always be effected, it is true, by means of direct synchronization, but that, when at the same time a regulating circuit is used which produces a regulating voltage by means of a phase-detector, it is necessary that in the ultimate stable state a phase difference remains between the synchronizing signal and the signal produced by the oscillator, since otherwise the phase detector cannot produce the required regulating voltage. In the circuit arrangement according to the invention this is achieved by integrating the square synchronizing pulses by means of the integrating network. Failing this, the direct synchronization would cause the oscillator signal to be phase-locked to the synchronizing signal so that, independently of the initial frequency deviation of the synchronizing signal from the natural frequency of the relaxation oscillator, the phase-detector would invariably produce the same regulating voltage and preclude readjustment.

As will be set out hereinafter, this drawback is obviated by deforming the square synchronizing signal.

In order that the invention may be readily carried into effect, forms of circuit arrangements according to the invention will now be described by way of example with reference to the accompanying drawings in which FIG. 1 shows the way in which phase-dependent direct synchronization is effected according to the principle of the invention.

FIG. 4 shows a possible form of a circuit arrangement according to the invention in block-schematic form.

FIG. 8 shows the input signals and output signals of a second phase detector for an in-synchronization condition corresponding to that of FIG. 2, and FIG. 9 shows the input signals and output signals of this second phase detector for a state corresponding to that of FIG. 3, while

Figure 1:
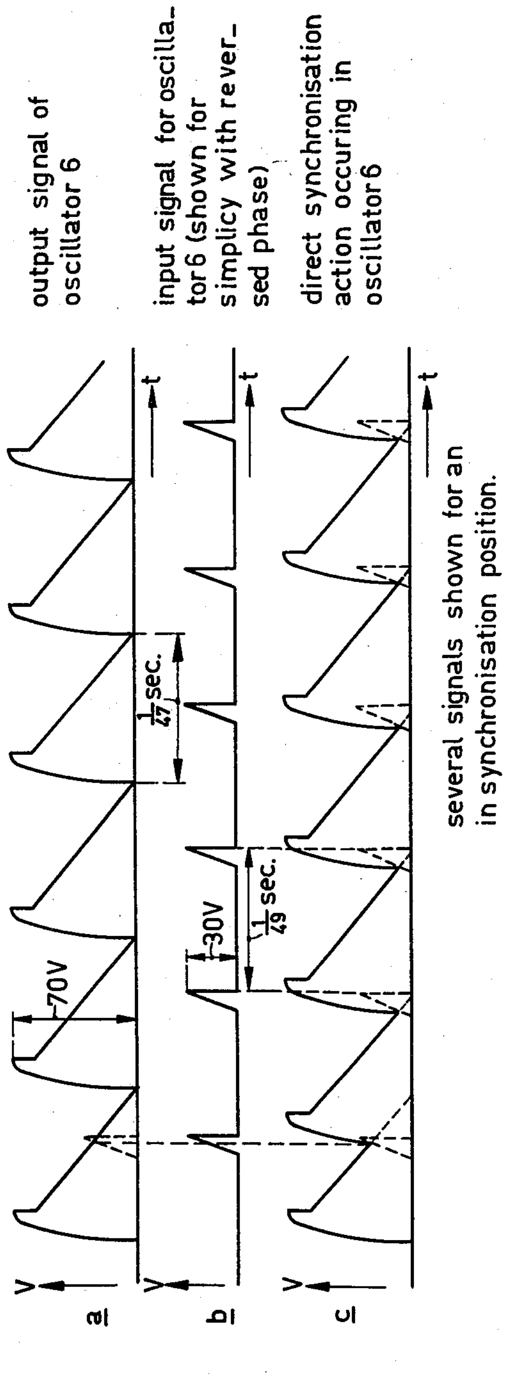

FIG. 1*a* shows the sawtooth output voltage of a Miller-Transitron-oscillator oscillating in its natural frequency. In this example, this Miller-Transitron oscillator is chosen as a sawtooth oscillator, it being very simple to change the frequency of the oscillator by means of the negative direct voltage produced by the phase detector proper. For this purpose, this negative direct voltage is supplied to the suppressor grid of the pentode tube used in this oscillator arrangement.

It will be clear, however, that for any other relaxation oscillator the same principle may be used, for example in the case of a blocking oscillator, comprising a triode, a blocking transformer, and the required RC-elements, by applying a negative bias voltage to the control grid of the triode via the RC-elements, and superposing the positive direct voltage derived from the said phase detector on this negative bias voltage. During the discharge of the capacitor present in the grid circuit, the grid voltage at which anode current tends to flow again will be reached sooner or later, according as the resulting negative bias voltage is lower or higher.

In a so-called out-of-synchronization condition, the used phase detector may produce no or nearly no direct voltage, so that the oscillator is capable of oscillating in its natural frequency which should be chosen so that its lower than the lowest possible frequency of the synchonizing signal. For that purpose it is desirable to choose an asymmetric detector as phase detector which is adjusted so that it meets the above condition.

The synchronization frequency may differ from transmitter to transmitter so that the said choice of the natural frequency of the oscillator is obligatory to ensure that in all circumstances the circuit arrangement is capable of effecting the synchronization automatically.

It is also necessary to make the amplitude of the synchronizing signal sufficiently large in order that this signal, which in the present example is supplied in the negative sense to the suppressor grid of the pentode tube, is capable of effecting synchronization also at relatively large frequency deviations between synchonization frequency and natural frequency of the oscillator.

If it is taken into account, for example, that the nominal raster frequency of the television receiver amounts to 50 c./s., deviations of, for example, from 47 to 53 c./s. are possible so that the natural frequency of the oscillator is to be equal to or lower than 47 c./s. However, the amplitude of the synchronizing signal is to be so large than that direct synchronization with a synchronizing signal of 53 c./s. can be effected.

FIG. 1*b* shows the triangular synchronizing signal formed according to the invention which can be obtained in a simple manner by integrating the square signal derived from the received television signal. For clearness' sake the signal in FIG. 1*b* is shown in the positive sense, although it is supplied to the said suppressor grid in the negative sense, to indicate at what instant the synchronizing pulses will initiate the fly-back of the relaxation oscillator.

This initiation is shown in FIG. 1*c* and it appears that owing to the slope of the synchronizing pulses the fly-back of the saw-tooth signal coincides with the occurring synchronizing pulses only after a few cycles and then not even entirely.

Figures 2, 5:
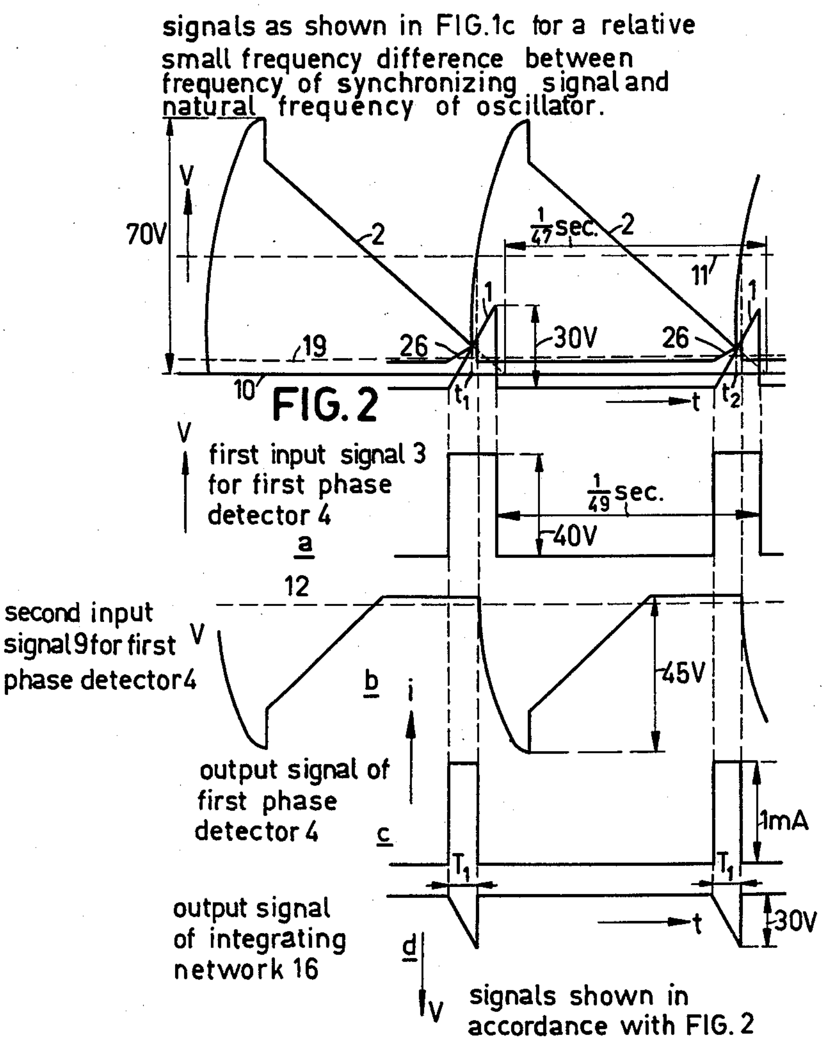
FIG. 2 shows a first.
FIG. 5 shows the various input signals and output signals of a phase detector included in the regulating circuit proper for an in-synchronization condition corresponding to that of FIG. 2.
Figures 3, 6:
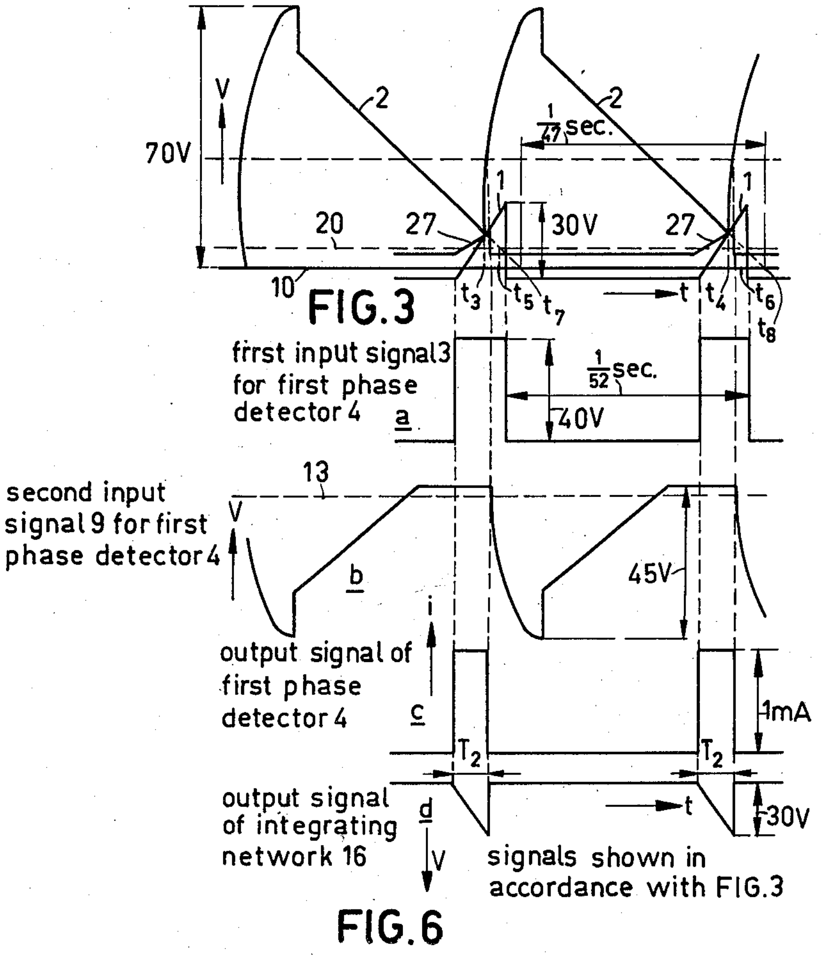
FIG. 3 shows a second so-called in-synchronzation condition, in which, however, in the case of FIG. 3 the natural frequency of the relaxation oscillator deviates more from that of the synchronizing signal than in the case of FIG. 2.
FIG. 6 shows these input signals and output signals for an in-synchronization condition corresponding to that of FIG. 3.

This is illustrated in the FIGS. 2 and 3. FIG. 2 shows an in-synchronization condition, the frequency of the synchronizing signal 1 deviating only little from the natural frequency of the oscillator which produces the oscillator signal 2. In FIG. 3 this frequency deviation is considerably larger.

In FIG. 2 the fly-back pulse and the synchronizing pulse consequently coincide more than in FIG. 3. In other words, the resulting phase difference between fly-back pulse and synchronizing pulse is larger in the case of FIG. 3 than in that of FIG. 2 so that in the case of a larger frequency deviation between the two said signals, the phase detector can produce a larger negative voltage than in the case of a smaller frequency deviation.

Should on the contrary, the square synchronizing signal not be integrated, as a result of which a signal would be available as shown in FIGS. 5*a* or 6*a*, the flyback of the sawtooth signal would invariably be initiated by the leading edge of the synchronizing signal, so that flyback pulse and synchronizing pulse would always coincide entirely, as a result of which there would be no phase difference between the two said signals and the phase detector would invariably produce the same direct voltage independent of the said frequency deviation.

It is noted that, as will be further explained, the way in which the control signals are supplied to the phase detector is of importance for a satisfactory operation of the circuit arrangement. For, should these signals be supplied to a so-called coincidence detector in the conventional manner, this detector would just deliver the maximum voltage if the synchronizing pulses and the fly-back pulses coincide and not a minimum voltage as is required here.

Also when a blocking oscillator or an astable multivibrator would be used, the positive direct voltage delivered by the phase detector should be larger according as the natural frequency of these oscillators deviates more from the synchronizing frequency, since the larger this deviation, the sooner anode current must flow in the regulated tube in each cycle.

Figures 4, 8, 9:
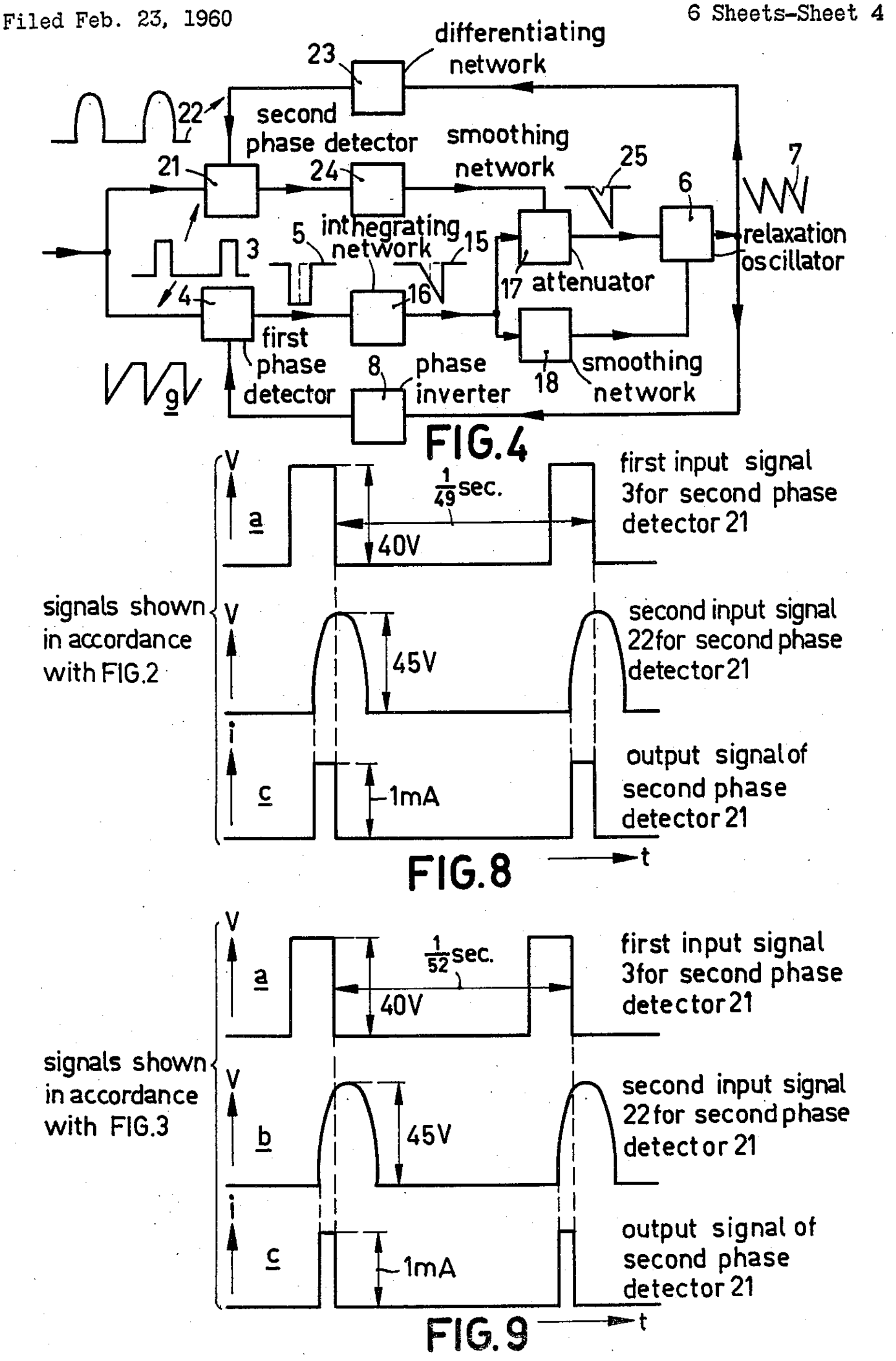

FIG. 4 shows in block-schematic form a possible embodiment of a circuit arrangement according to the invention. In this case, the square synchronizing pulses 3 are supplied to a phase detector 4. This phase detector is a coincidence detector, but so that in the insynchronization condition amplified synchronizing pulses 5 of negative polarity and reduced pulse duration are produced at the output of the detector 4. For that purpose the sawtooth voltages 7 produced by the Miller-Transitron oscillator 6 are inverted in phase by a phase-inverter 8 and, after limiting in the inverter 8 or in the phase detector 4, are compared as comparison signal 9 with the synchronizing signals 3.

This is illustrated with reference to the FIGS. 5 and 6 which, for clearness' sake, are drawn under the FIGS. 2 and 3 to indicate how, at definite frequency deviations between the integrated synchronizing signal and the natural frequency of the oscillator signal 2, the phase position of the square synchronizing signals 3 is (see FIGS. 5*a* and 6*a* respectively) in the phase detector 4 with reference to the comparison signals 9 (see FIGS. 5*b* and 6*b* respectively). It is assumed in the first instance that the integrated synchronizing pulses 1 have effected the synchronization and that no ore nearly no regulating voltage is delivered by the phase detector 4. The pulses 1 then fluctuate around an average voltage level as indicated by the line 10 and make provision for the beginning of the flyback at the instants $t_1$ and $t_2$ respectively, in the case of FIG. 2 and at the instant $t_3$ and $t_4$ respectively in the case of FIG. 3.

The flattened comparison signal 9 is obtained by inverting the signal 2 in phase and limiting it to the voltage level indicated by the line 11. The phase detector 4 is adjusted so that current can flow through this detector only when the comparison signal 9 exceeds the level indicated by the lines 12 (FIG. 5*b*) and 13 (FIG. 6*b*) and synchronizing pulses 3 occur simultaneously. If this is the case, a pulsatory current tends to flow through the detector 4, which, at a frequency deviation as shown in FIG. 2, is shown in FIG. 5*c* and which has a pulse duration $T_1$ and, at a frequency deviation as shown in FIG. 3, is shown in FIG. 6*c* with a pulse duration $T_2$.

This pulsatory current causes a negative going pulsatory voltage 5 at the output terminals of 4 which voltage is integrated, to obtain a triangular pulse 15, by the integrating network 16 and is applied, for direct synchronization, to the oscillator 6 via an attenuator 17, which is controlled by a part of the circuit arrangement to be described separately.

In the above described in-synchronization condition, the square synchronizing signal consequently becomes a variable pulse duration, dependent on the difference in frequency between the frequency of the synchronizing signal and the natural frequency of the oscillator.

This pulsatory signal 15 is also supplied to a smoothing network 18 so that at the output terminal of 18 a smoothed negative direct voltage appears which is supplied to the oscillator 6 as regulating voltage and which, in the case of FIG. 5, is smaller than in the case of FIG. 6 since $T_1<T_2$, so that the average value of the triangular pulses shown in FIG. 5*d* is smaller than that shown in FIG. 6*d*. The time constant of the smoothing network 18 is very large, for example 5–10 sec., so as to obtain a satisfactory flywheel action for the regulating circuit. Therefore, after establishing synchronization by means of the direct synchronization, it will take some time before the said regulating voltage has reached its ultimate value. This means that the voltage level at which the flyback of the sawtooth signal 2 would begin when the synchronizing pulses are not supplied, which level is indicated by the line 10, slowly shifts owing to the supplied negative regulating voltage, namely in the case of FIG. 2, towards the level indicated by the line 19 and, in the case of FIG. 3, in which a larger negative direct voltage is produced, towards the level indicated by the line 20. It appears that dependent on the original frequency deviation between synchronizing signal and natural frequency of the oscillator 6, the frequency of the produced signal 2 is matched so that the direct synchronizing need only to make provision for the fine adjustment. In other words, the phase detector 4 with the networks 16 and 18 takes over the adjustment which without this automatic means had to be adjusted manually and which changes the natural frequency of the oscillator so much that a normal synchronizing pulse having none too large an amplitude is capable of effecting synchronization.

The none too large amplitude is obtained by supplying the square synchronizing signal 3 also to a second phase detector 21. To this detector 21 is also supplied a pulsatory signal 22, which is obtained by differentiating the sawtooth signal 7 derived from the oscillator 6 in a differentiating network 23. The signal 3 is again shown in FIGS. 8*a* and 9*a* and the signal 22 in FIG. 8*b* for a frequency deviation as shown in FIG. 2 and in FIG. 9*b* for a frequency deviation shown in FIG. 3. At the output of 21 a pulsatory signal is produced which, dependent on the said frequency deviation will have a form as indicated in the FIGS. 8*c* and 9*c*. This output signal is smoothed by means of a network 24 and supplied to the attenuator 17 as control voltage. According as the output voltage of 18 slowly increases as a result of the large time constant of this network, the voltage level shown in the FIGS. 2 and 3 rises from the level indicated by the line 10 to the level indicated by the lines 19 and 20 respectively and the pulses 15 reduced already in duration are attenuated simultaneously, so that in the ultimate state shorted and attenuated synchronizing pulses 25 are formed which are indicated by the pulses 26 in the case of FIG. 2 and by the pulses 27 in the case of FIG. 3.

The attenuation of the synchronizing pulses is effected for two reasons.

As appears from FIGS. 2 and 3, the unshortened and unattenuated synchronizing pulses 1, which are obtained in a manner to be further described, fluctuate around the level, indicated by the line 10. If this level rises to the level indicated by the lines 19 and 20 respectively, the average value around which the synchronizing pulses are fluctuating rises. Should they not be shortened and attenuated, it means that interference pulses, likewise fluctuating around the level of lines 19 and 20 respectively, would also have a large amplitude, as a result of which these pulses would cause an undesired flyback. However, if these pulses are shortened and attenuated so that at the control voltage supplied by 18, direct synchronization is just possible, also the interference pulses will be gated and attenuated because they can only occur during the period that the comparison signal 9 exceeds the level indicated by the line 12, while the attenuator 17 controlled by 21 is operative.

The exact shortening of the synchronizing pulses is obtained by limiting the in phase inverted sawtooth voltage according to a level shown by the line 11. Since the leading edge of the flyback of the sawtooth voltage is not infinitely steep, the instants at which this comparison signal falls below the level indicated by the line 12 will invariably occur after the instants $t_1$ and $t_2$ of FIG. 2 and after the instants $t_3$ and $t_4$ of FIG. 3, thanks to the said limitation.

A second reason why attenuation of the synchronizing pulses is desirable is that the direct voltage at the output terminal of 18 is now obtained with less amplification than without this attenuation. For, should the pulses 1 be shortened but not attenuated, the pulses 1, with the line 10 shifting upwardly, would maintain the same slope and also shift upwardly with this same slope. Since the beginning of the flyback is indicated by the point of intersection of a triangular pulse and the sawtooth voltage, the result would be that the synchronizing pulses would coincide more with the flyback pulses and this results in the pulse duration of the pulses 5 decreasing considerably. As a result of this, also the average value of this output signal will decrease considerably at the same degree of amplification of the detector 4. If, therefore, the same negative control voltage is to be obtained from the smoothing network 18 using unattenuated synchronizing pulses, the amplification of 4 should be boosted. This means that disturbances, if any, will also be amplified more, so that the influence of these disturbances is not only stronger because they are not attenuated in the attenuator 17 but are, in addition, amplified extra in the detector 4.

If on the contrary the synchronizing pulses are attenuated, their slope changes so that pulses 26 and 27 respectively are formed. As is seen from FIGS. 2 and 3, the pulse duration $T_1$ of the signal shown in FIG. 5*d* and the pulse duration $T_2$ respectively of the signal shown in FIG. 6*d* does, as a result, not change so that also the average value of the signal supplied to 18 will remain the same during the slow building up of the output voltage of the network 18.

FIG. 3 also proves the importance of the direct voltage supplied by 18 in case of the synchronizing pulses failing. For, if some synchronizing pulses fail, this direct voltage will shift the beginning of the flyback from the instant $t_3$ to the instant $t_5$ or from $t_4$ to $t_6$, but without this direct voltage this beginning will shift from the instant $t_3$ to the instant $t_7$ or from $t_4$ to $t_8$. This means that the amplitude of the sawtooth control voltage changes considerably, so that also the height of the reproduced picture varies strongly when some synchronizing pulses fail which is very annoying for the viewer. The use of the regulating circuit phase detector 4 and smoothing network 18 with large time constant ensured a satisfactory flywheel action, since the produced direct voltage is maintained for a rather long time so that the frequency and the amplitude of the produced sawtooth voltage will change only little also in the case of several synchronizing failing.

If by some cause or other the synchronization is lost, two states are to be distinguished. In the first place, the frequency $f_s$ of the synchronizing signal may be lower than the frequency $f_o$ of the produced oscillator signal, for example, because the output voltage of 18 has not yet leaked away sufficiently when this off-synchronization state is caused by commutation from one transmitter to another. In the second case, $f_s$ is higher than $f_o$ and this state may result from switching-on the receiver.

Figure 7:
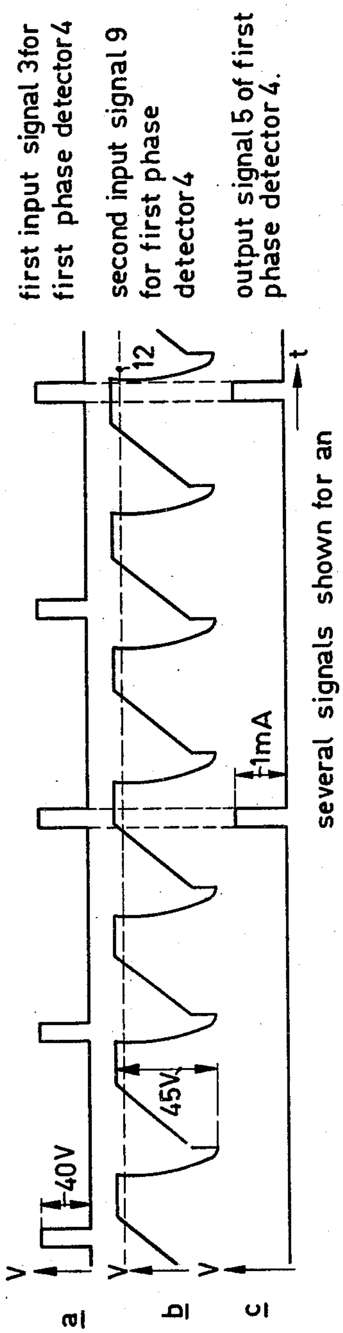
FIG. 7 shows the input signals and output signals of the so-called phase detector for a so-called out-synchronization condition.

For clearness' sake, the state for $f_s<f_o$ is shown in FIG. 7 in a somewhat exaggerated manner. For that purpose, FIG. 7*a* shows the synchronizing signal 3 and FIG. 7*b* the comparison signal 9. Since detector 4 will only convey current when the voltage of the signal 9 exceeds the level indicated by the line 12 and simultaneously synchronizing pulses occur, the resulting current through detector 4 is as shown in FIG. 7*c*, from which it appears that now only after a certain number of cycles, synchronizing pulses of unshortened duration will be transmitted, so that the average value of this output signal lies far below that of the detector 4 in the in-synchronization condition in which during each cycle of the synchronizing signal a pulse, shortened it is true, will be transmitted. Therefore, the average output voltage of 4 in the out-of-synchronization condition will be considerably smaller than for an in-synchronization condition, so that in the case of a definite output voltage at the terminals of 18, this voltage will be capable of leaking away slowly, as a result of which the signal produced by the oscillator 6 will gradually tend to approach the natural frequency of the oscillator. Once a frequency is reached lower than that of the synchronizing signal, a direct synchronization can be effected as shown in FIG. 1. In fact, each occurring unshortened pulse will initiate a beginning of a flyback. However, as long as the voltage of 18 has not decreased sufficiently, $f_s$ remains smaller than $f_o$, as a result of which again some cycles have to elapse before the next flyback can be initiated. The direct synchronization is affected by the attenuator 17 not being operative at all, since also the second phase detector 21 does not supply any voltage in this out-of-synchronization condition and, consequently, the negative output pulses of 4, after integration in 16, are supplied to the oscillator 6 unshortened (solid line curve 15) and unattenuated (solid line curve 25) as indicated by the pulses 1 in FIGS. 2 and 3.

If on the contrary $f_s > f_o$, the output voltage of 18 will be very low as long as the synchronization has not been effected. However, this may be started by the first incoming unshortened synchronizing pulse in a manner as shown in FIG. 1, after which a similar process as described above will start.

However, when establishing synchronization, a difficulty presents itself in connection with the large time constant of the network 18. For, if no special measures be taken, the direct synchronization would cause synchronization after some cycles, and, if the time constant of the network 24 is small with respect to that of network 18, the attenuator 17 would already have attenuated the pulses considerably before the output voltage of 18 has risen to the ultimately required value. As a result of this, the amplitudes of the direct synchronizing pulses have become too small, so that the synchronization is lost again. The output voltage of 21 tends to decrease, as a result of which the amplitude of the synchronizing pulses increases, synchronization is established again, is lost again etc., so that an unstable state is formed.

However, the time constant of the network 24 should always be much smaller than the time constant of the network 18, since, when synchronization is lost by some cause or other, the unshortened and unattenuated pulses should always be available as rapidly as possible, in order that the synchronization is established immediately at the moment the voltage of 18 has leaked away. In order to render a stable circuit arrangement possible at a time constant of 24 which is small with respect to that of 18, the sawtooth signal should not be phase inverted before being supplied to the differentiating network 23. As a result, in the out-of-synchronization condition, the synchronizing and flyback pulses do not coincide at all, while when establishing synchronization, both pulses will coincide more and more, as a result of which the output voltage of 21, smoothed by 24, will tend to rise more and more. In consequence of this the pulses 1 are attenuated more and more, which means that the slopes of the triangular pulses decreases. Since the output voltage of 18 increases far more slowly, the line 10 will not shift provisorily and therefrom it follows that the synchronizing pulses 1 in FIGS. 2 and 3 will shift to the left with respect to the signal 2, since the point of intersection of signals 1 and 2 has to remain at about the same level. The phase difference between synchronizing and flyback pulses increases and therefrom it follows, as may be seen from FIGS. 8 and 9, that the pulse-duration of the output signal of 21 decreases and consequently the average control voltage for the attenuator will decrease. As a result of this the attenuation decreases and the synchronization is not lost. The output voltage of 18 can be built up slowly, as a result of which the line 10 can shift upwards and the synchronizing pulses can shift to the right again.

The attenuation arrangement consequently is self-braking and, dependent on the difference in time constant between the networks 18 and 24, the shifting to and fro of the pulses 1 can occur a couple of times. This movement may be considered as an attenuated oscillation which terminates at the moment that the output voltage of 18 has reached its ultimate value.

Figure 10:
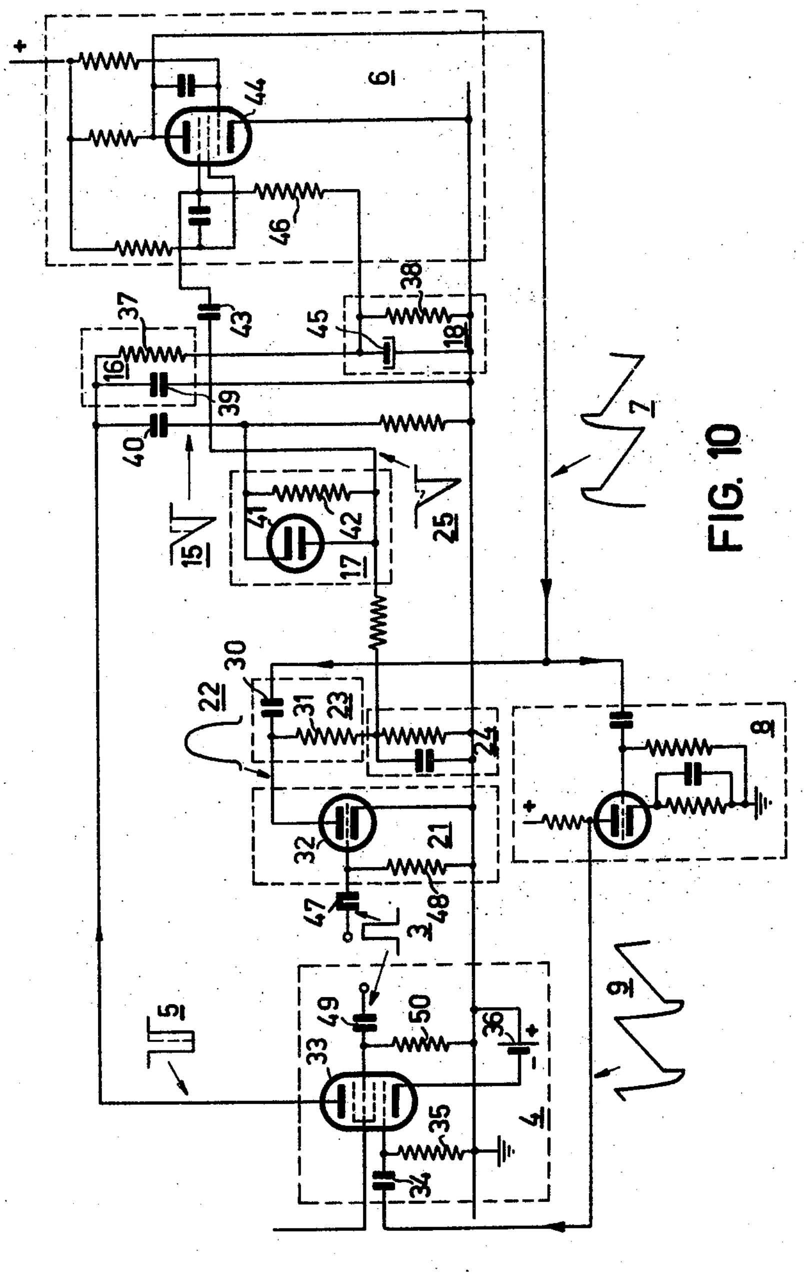
FIG. 10 shows the circuit arrangement according to the invention with the use of discharge tubes.

FIG. 10 shows an embodiment with discharge tubes, corresponding parts being numbered correspondingly as much as possible. As stated, the oscillator 6 is a Miller-Transitron oscillator, having a pentode tube, from the anode of which the sawtooth signal 7 is derived. This signal is supplied to the phase detector 4 via the phase inverter 8 and, via the differentiating network 23, comprising the capacitor 30 and the resistor 31, to the anode of the triode 32, forming part of the second phase detector 21, to the control grid of which the square synchronizing signal 3 is supplied via grid capacitor 47 and leakage resistor 48. Because grid current tends to flow, the required negative bias voltage is produced for the tube 32.

The phase detector 4 consists of a multiple grid tube 33, to the control grid of which the signal 7 inverted in phase is supplied as a comparison signal 9 via a grid capacitor 34 and a leakage resistor 35. Since the cathode of this tube has been brought at a negative potential with respect to earth by means of the battery 36, grid current which limits the signal 9 occurs in the peaks of this signal, so that the flat peak shown in FIGS. *5b* and *6b* respectively is formed. At the same time the capacitor 34 is charged by the grid current, as a result of which the required negative grid voltage is obtained. The synchronizing signal 3 is supplied to the second control grid of the tube 33 via grid capacitor 49 and leakage resistor 50, the required negative bias voltage for this second control grid being obtained by the grid current. The anode of this tube is connected to earth via the resistors 37 and 38 and, failing incoming signals, consequently is at earth potential. The screen grids can be brought at a small positive potential with respect to earth or can be given earth potential according to the desired adjustment. If a pulsatory current flows through tube 33 as shown in the FIGS. *5c* and *6c* for an in-synchronization and in FIG. *7c* for an out-of-synchronization condition, the anode will become negative with respect to earth during the flow of this pulsatory current. The thus formed negative pulse voltages 5 are integrated by the integrated network 16 comprising the resistor 37 and the capacitor 39, and are supplied as integrated pulses 15 to the attenuator 17 via the coupling capacitor 40.

This attenuator 17 comprises a parallel combination of a diode 41 and a resistor 42. In the out-of-synchronization condition, phase detector 21 produces no voltage, so that the diode 41 is not blocked and the pulses 15, unshortened and unattenuated, are supplied for direct synchronization, to the suppressor grid of the pentode 44 via the capacitor 43.

In the in-synchronization condition on the contrary, detector 21 produces a definite voltage, dependent on the phase difference between synchronizing and flyback pulses, which voltage is smoothed by the filter 24 and blocks the diode more or less. As a result, the overall resistance value of the parallel combination 41, 42 becomes larger and the pulses 15 are attenuated.

The negative pulses 15 produced across the capacitor 39, are also supplied, via the resistor 37, to the smoothing network 18 comprising the resistor 38 and the high-value capacitor 45. By means of this network, the pulses 15 are smoothed as good as possible, so that a negative direct voltage is produced across the capacitor 45 which voltage is supplied to the suppressor grid of the tube 44 via the leakage resistor 46.

If this negative voltage is low, the point at which with decreasing anode voltage the anode current in tube 44 is blocked in favour of the screen grid current, is reached later than in the case of a higher negative voltage at this suppressor grid. That is why the line 10 in the FIGS. 2 and 3, in which the signal 2 represents the voltage at the anode of the tube 44, shifts upwards with the output voltage of 18 increasing and that is why, too the negative going pulses 25 are shown in the way as is done in the FIGS. 1, 2 and 3 (in the FIGS. 2 and 3 the pulses 25 are indicated by the numerals 1, 26 and 27).

It will be clear that, when a different type of relaxation oscillator is used, also the polarities of the various voltages have to be matched. However, the idea of the triangular synchronizing signal remains valid undiminished. This has already been pointed out above for a blocking oscillator, but also in the case of an astable multivibrator arrangement having two discharge tubes as relaxation oscillator, a negative bias voltage for a control grid of one of the two tubes must be combined with a positive regulating voltage of the phase detector 4. Also the synchronizing pulse 1 should be directed positively and be supplied to the same grid as that to which the regulating voltage is set up, while the comparison signal must be derived from the anode of the regulating tube.

Should, in the case of the multivibrator, the phase detector 4 be used in a corresponding manner as in the present example, the time that the tube, to the control grid of which the synchronizing pulses 1 are supplied, is blocked, should be shorter than the time that the other tube is blocked namely corresponding to the same part of the period as indicated for the flat peak of the comparison signal 9 in the FIGS. *5b*, *6b* and *7b*.

The main thing always is that in the in-synchronization condition the comparison signal supplied to the phase detector 4 blocks the current through this detector at or shortly after the instant at which the flyback of the oscillator is initiated. In the case of the astable multivibrator arrangement, the instant at which the tube regulated in its grid circuit is released by the synchronizing pulses is to be considered as the beginning of this flyback.

The attenuation circuit arrangement is not strictly necessary. If a larger sensitivity to interference is acceptable, the synchronizing pulses may have a larger amplitude in the in-synchronization condition and also the amplification of the detector 4 will have to be larger than when the synchronizing pulses are attenuated.

It will also be clear, that the circuit arrangement according to the invention can be used in all those cases in which a relaxation oscillator of a comparatively low natural frequency is to be synchronized by means of square synchronizing pulses and large frequency deviations may occur between the frequency of the synchronizing signal and the natural frequency of the relaxation oscillator.

If the pulse duration of the triangular pulses used for the direct synchronization are not to be shortened, it is not necessary to obtain them via the integrating network 16 of the detector 4. In that case, an input terminal of the integrating network 16 may be connected directly to the synchronization separator in the receiver and on input terminal of the smoothed network 18 with the output terminal of the phase detector 4. The limiting level indicated by the line 11 in FIG. 1 may then be shifted, so that the duration of the flat peak of the comparison signal 9 is shortened. As a result, the output voltage of the phase detector 4 may be smaller in the out-of-synchronization state.

What is claimed is:

1. A synchronizing circuit for a relaxation oscillator comprising a source of square synchronizing pulses, a relaxation oscillator, means providing a direct voltage dependent upon the relative phases of said synchronizing pulses and the output of said oscillator, means applying said direct voltage to said oscillator to control the natural frequency thereof, and means providing direct synchronization of said oscillator comprising means providing square pulses having variable widths dependent upon the relative phases of said synchronizing signals and oscillator output, means integrating said variable width pulses, and means applying said integrated pulses to said oscillator.

2. A synchronizing circuit for a relaxation oscillator comprising a source of square synchronizing pulses, a relaxation oscillator, phase detector means, means applying said synchronizing pulses and the output of said relaxation oscillator to said phase detector means to provide a comparison pulse having a pulse width dependent upon the relative phases of said synchronization pulses and the output of said oscillator, filter means having a long time constant with respect to the period of said oscillator, means integrating said comparison pulses, means applying said integrated pulses to said filter, and means applying the output of said filter means and said integrated comparison pulses to said relaxation oscillator for controlling the frequency thereof.

3. The circuit of claim 2, in which said phase detector is an asymmetric detector, and said phase detector provides substantially no output when said oscillator is out of synchronism with said synchronization pulses.

4. The circuit of claim 2, comprising means for applying the output of said oscillator to said phase detector with a polarity to cut off said phase detector substantially at the time of initiation of flyback of said oscillator.

5. The circuit of claim 4, in which the duration of time in which the oscillator output may render said phase detector conductive exceeds the pulse duration of said synchronizing pulses.

6. A synchronizing circuit for a relaxation oscillator comprising a source of square synchronizing pulses, a relaxation oscillator, phase detector means, means applying said synchronizing pulses and the output of said relaxation oscillator to said phase detector means to provide a comparison pulse having a pulse width dependent upon the relative phases of said synchronization pulses and the output of said oscillator, filter means having a long time constant with respect to the period of said oscillator, means integrating said comparison pulses, means applying said integrated pulses to said filter, attenuating means, means applying said integrated pulses to said attenuating means, and means for applying the outputs of said filter means and attenuating means to said relaxation oscillator for controlling the frequency thereof, said attenuating means comprising means for controlling the attenuation of said integrated pulses as a function of the relative phase between said synchronizing pulses and the output of said oscillator.

7. A synchronizing circuit for a relaxation oscillator comprising a source of square synchronizing pulses, a relaxation oscillator, first phase detector means connected to provide output comparison pulses having widths dependent upon the relative phases of said synchronizing pulses and the output of said oscillator, filter means having a long time constant with respect to the period of said oscillator, means applying the output of said first phase detector to said filter means, means integrating said comparison pulses, means attenuating said integrated pulses, means applying the outputs of said attenuating means and filter means to said oscillator to control the frequency thereof, second phase detector means providing a voltage responsive to the relative phases of said synchronizing pulses and the output of said oscillator, and means applying said voltage to said attenuator to vary the attenuation thereof whereby in the in-synchronization condition of said circuit the integrated pulses applied to said oscillator have reduced amplitude.

8. The circuit of claim 7, comprising means applying the output of said oscillator to said second phase detector with a polarity to release said second phase detector substantially at the time of initiation of flyback in said oscillator.

9. The circuit of claim 7, comprising differentiation circuit means for applying the output of said oscillator to said second phase detector.

References Cited in the file of this patent

UNITED STATES PATENTS 2,740,046 Tellier ---------------- Mar. 27, 1956